องค์

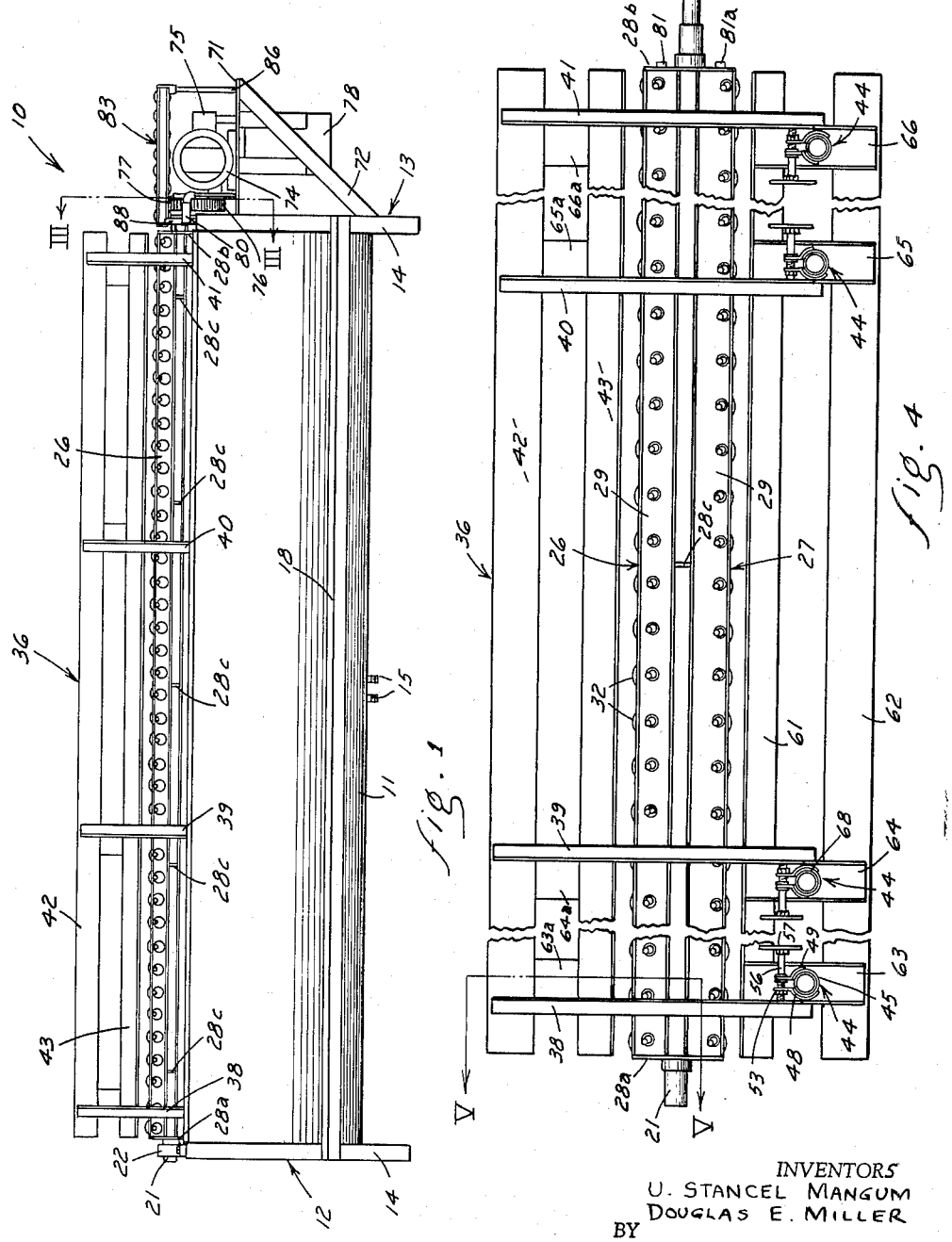

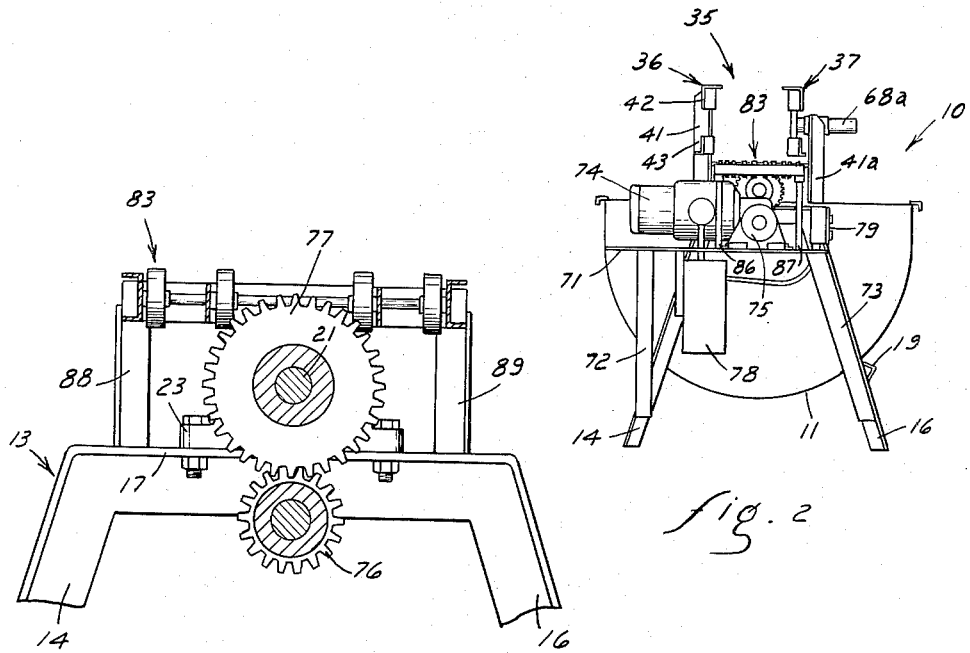
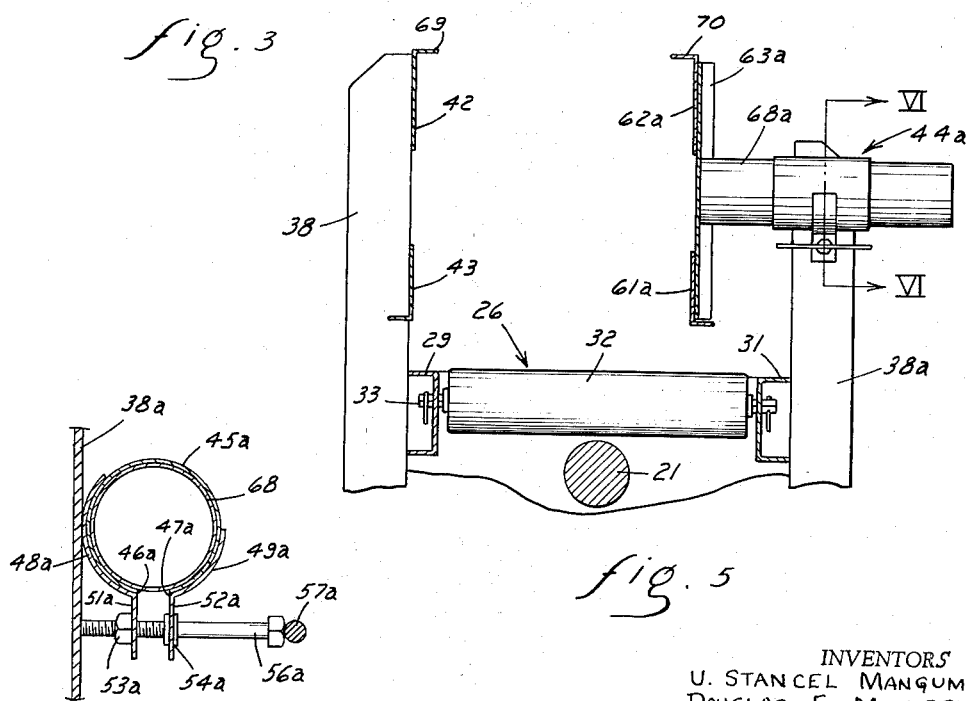

United States Patent Office 2,988,239
Patented June 13, 1961

2,988,239
BATTERY ACID DUMPER
Douglas E. Miller and Uvas Stancel Mangum, Midvale, Utah, assignors to Winkel Machine Company, Inc., Watervliet, Mich., a corporation of Michigan
Filed Aug. 27, 1958, Ser. No. 757,607
3 Claims. (Cl. 214—312)

This invention relates to a machine for dumping acid from batteries and, particularly, relates to a machine capable of handling two groups of batteries at a time wherein acid may be dumped from one group of batteries while the previously dumped group of batteries is removed from the machine and is replaced with another group of batteries intended for subsequent dumping.

While a variety of techniques have been used for dumping acid from battery casings, none of these techniques have been completely satisfactory. In many instances, acid has been dumped from batteries by manually inverting individual battery casings while holding same over a suitable receptacle. This technique is not only slow but it is also dangerous since a careless operator will spill the acid on his person or clothing. Prior machines for dumping acid from batteries have not been completely satisfactory because they either did not have sufficient capacity, were too slow in operation or were too complicated and expensive.

Accordingly, it is an object of this invention to provide a machine for dumping acid from batteries which will operate with maximum speed and efficiency, which can be operated by a single operator and which will not involve any safety hazards.

It is a further object of this invention to provide a machine, as aforesaid, including two battery support conveyors adapted to be positioned so that the previously dumped batteries on one conveyor may be removed and a new group of batteries placed thereon while another group of batteries on the other conveyor is being dumped.

It is a further object of this invention to provide a machine, as aforesaid, including structure for positively guiding and supporting the batteries as they are moved from an upright position into inverted position for dumping the acid therefrom and as they are returned to their upright position.

It is a further object of this invention to provide a machine, as aforesaid, which is inexpensive to manufacture and maintain, reliable in operation, and which will perform the battery dumping operation on successive groups of batteries more rapidly than has been possible heretofore.

Other objects and advantages of this invention will become apparent to those acquainted with equipment of this type upon reading the following description and inspecting the accompanying drawings, in which:

FIGURE 1 is a side view of the battery acid dumping machine.

FIGURE 2 is an end elevational view taken from the rightward end of the machine as appearing in FIGURE 1.

FIGURE 3 is a sectional view taken along the line III—III of FIGURE 1.

FIGURE 4 is a side elevational view of the conveyor and battery support frame.

FIGURE 5 is a sectional view taken along the line V—V of FIGURE 4.

FIGURE 6 is a sectional view taken along the line VI—VI of FIGURE 5.

*General description*

In meeting the objects and purposes of the invention set forth above as well as others related thereto, the invention provides a machine comprising a pair of parallel, back-to-back connected roller conveyors which are mounted parallel with and on opposite sides of a pivot shaft. The pivot shaft is pivotally supported at its respective ends on the ends of an elongated tank. A motor is connected for rotating the shaft so that the conveyors are moved between an uppermost horizontal position in which the batteries are in an upright position and a lowermost horizontal position in which the batteries are inverted so that acid therein is dumped therefrom into the tank. A battery guide frame is mounted above each of the conveyors and is adapted to guide the movement of the batteries as same are inverted. The battery guide frame is adjustable for accommodating batteries of various sizes.

*Detailed description*

The battery acid dumping machine 10 includes a semi-cylindrical tank 11 for receiving the battery acid. Support structures 12 and 13 are secured, as by welding, to the respective ends of the tank 11. The support structures 12 and 13 are substantially identical and each include a pair of upwardly converging legs 14 and 16 whose upper ends are connected by a horizontal connecting web 17, said web being substantially co-planar with the upper edge of the tank 11. A pair of longitudinally extending support bars 18 and 19 are connected at their respective ends to corresponding legs of the support structures 12 and 13. The support bars engage the periphery of the tank and support same. The legs 14 and 16, the web 17 and the support bars 18 and 19 are herein for convenience shown as being formed of angles.

The tank 11 has drain pipes 15 extending therefrom whereby acid therewithin may be drained therefrom.

An elongated shaft 21 extends longitudinally of the tank 11 and is substantially coaxial therewith. The respective ends of shaft 21 extend slightly beyond the ends of tank 11 and are rotatably supported in bearing blocks 22 and 23 which are secured to the webs 17 of the respective support structures 12 and 13. A pair of elongated, parallel, straight-line roller conveyors 26 and 27 are secured to the shaft 21 for rotation therewith. In the disclosed embodiment of the invention, the frames of the conveyor structures are secured, as by welding, to end plates 28a and 28b and intermediate plates 28c and said plates are secured, as by welding, to the shaft 21. The conveyors 26 and 27 are positioned on diametrically opposite sides of the shaft 21 in back-to-back relationship. The conveyors are of slightly less axial length than the length of tank 11 so that said conveyors may move through an arcuate path in response to rotation of shaft 21 upwardly and downwardly within said tank.

The conveyors 26 and 27 are of conventional structure and are substantially identical. Each, as shown in FIGURE 5 with respect to conveyor 26, include a pair of channel-shaped side members 29 and 31. Rollers 32 are rotatably supported in side members 29 and 31 by shafts 33. The shafts 33 of the rollers lie in a common plane, which plane is offset upwardly from the center of the side members 29 and 31 so that the periphery of the rollers is slightly above the upper edge of said side members. Thus, batteries placed on the conveyors may be moved freely therealong on top of the rollers 32. The batteries may be considered to be supported in a plane tangent to the uppermost portion of the periphery of the rollers and this plane shall be referred to hereinafter as the "battery support plane."

A battery guide and support frame 35 is secured to the conveyors 26 and 27 and extends upwardly and downwardly, respectively, therefrom adjacent the side edges thereof. The battery guide support frame 35 includes a pair of side structures 36 and 37 which are positioned adjacent the respective sides of the conveyors 26 and 27, Since the side structures are identical only side structure 36 will be described in detail herein and it will be understood that the description applies equally well to the other side structure 37. The corresponding parts on the side structure 37 will be indicated by the same reference numerals with the suffix "a" applied thereto. In the disclosed embodiment of the invention the side structure 37 is inverted with respect to the side member 36 but it is to be understood that this arrangement is not essential for the purposes of the invention.

The side structure 36 includes a plurality, here four, of upright members 38, 39, 40 and 41 (FIGURE 1) which are secured, as by welding, to the lateral edges of the side members 29 of the conveyors 26 and 27. The uprights 37, 38, 39 and 40 have a pair of vertically spaced side members 42 and 43 secured thereto and positioned above and extending longitudinally of the conveyor 26.

A clamp assembly 44 (FIGURE 4) is secured to the other end of each of the uprights. Each clamp assembly (referring now for convenience to a clamp assembly 44a in FIGURE 6) includes an axially split clamp tube 45 having opposed, axially extending edges 46a and 47a. A pair of opposed, arcuate segments 48a and 49a are secured to and partially surround the tube adjacent the edges 46a and 47a and are adapted to be moved toward and away from each other to move said edges toward and away from each other. The segments 48a and 49a have parallel flanges 51a and 52a extending away therefrom adjacent the edges 46a and 47a. A nut 53a is secured to flange 51a. A threaded rod 56a extends through openings in the flange and threadedly engages the nut 53a. The threaded rod 56a has washers 54 secured thereto and positioned on either side of flange 52a. The threaded rod 56a abuts against the surface of the upright so that said rod is axially non-movable. Thus, upon rotation of the rod 56a by manual operation of the handle 57a, the nut 53a will be moved axially along the rod to move the edges 46a and 47a toward or away from each other.

The side structure 36 includes a pair of vertically spaced side members 61 and 62 (FIGURE 4) positioned below the side edge of and extending longitudinally of the other conveyor 27. The members 61 and 62 are secured to a plurality, here four, of vertically extending, channel-shaped connectors 63, 64, 65 and 66. A tube 68 is secured to the web of each connector and extends transverse thereto and away from said conveyor. Each of the tubes 68 is slidably received within a clamp tube 45 of a clamp assembly and may be releasably clamped into adjustable position thereby. Thus, upon rotation of the rods 56, the clamp tubes 45 expand to free the tube 68 for sliding movement transverse of the conveyor. When the tubes 68 and thereby the side members 61 and 62 have been positioned as desired, the threaded rods 56 may be rotated to move the edges 46 and 47 of the clamp tubes 45 toward each other so that said clamp tubes seize upon and hold the tubes 68 in such position.

The opposed side members 42 and 62a above conveyor 26 and the corresponding side members for conveyor 27 are turned inwardly toward each other to define battery support flanges 69 and 70 (FIGURE 5). When the conveyor is in inverted position, the battery casings will be supported on and by flanges 69 and 70.

Thus, as shown in FIGURE 5, a battery receiving zone is defined between the battery supporting plane of conveyor 26, the side members 41 and 42 on one side structure and the side members 61a and 62a on the other side structure. A corresponding receiving zone is defined between the other conveyor 27 and the side members corresponding to members 41, 42, 61a and 62a.

A horizontal plate 71 is supported adjacent one axial end of tank 11 by legs 72 and 73 which are secured to the legs 14 and 16, respectively, of the support structure 13. A motor 74 is mounted on the upper surface of plate 71 and is connected through a speed reducer 75 to a drive gear 76. The gear 76 meshes with a gear 77 which is secured to the shaft 21 whereby said shaft is rotated when motor 74 is energized. A control box 78 is secured to the lower surface of plate 71 and is connected for energizing the motor 74. A manually operated stop-start switch 79 is mounted upon the plate 71 and is electrically connected to the control box 78. A limit switch 80 is mounted upon a plate 71 and is positioned above the upper edge, and axially inwardly, of tank 11. The limit switch 80 is positioned so that it can be actuated by cam 81 (FIGURE 4) on the end plate 28b of the conveyor assembly. The switch 80 is connected so that when actuated by cam 81, it will de-energize the motor 74 and also re-set switch 79 for a subsequent starting operation. Thus, upon pressing the start button of switch 79, the motor 74 will be energized and will rotate shaft 21 and thereby move the conveyors 26 and 27 until cam 81 actuates switch 80. Thereupon, the motor will be de-energized to terminate rotation of shaft 21 and the switch 79 will be re-set for a subsequent operation. The cam 81 will be positioned so that the switch 80 will be actuated to de-energize the motor so that the conveyors 26 and 27 will be in a substantially horizontal position when movement thereof is ended.

A wheel conveyor 83 (FIGURE 1) is supported on the plate 71 above the speed reducer 75 and the gears 76 and 77 by legs 86, 87, 88 and 89. The plane defined by the uppermost portions of the periphery of the wheels of the conveyor 83 is substantially co-planar with the battery support plane of the uppermost conveyor when the conveyors are in horizontal position. Thus, batteries may be placed on a wheel conveyor 83 preparatory to moving same axially of the tank 11 onto the uppermost one of the conveyors.

Operation

While the operation of the machine is believed to be apparent in view of the foregoing description, it will be briefly repeated for purposes of completeness.

Starting with the parts positioned as shown in FIGURE 1, batteries may be loaded upon the uppermost conveyor 1 by placing them upon the conveyor 83 and then moving them axially of the tank onto the conveyor 26. The adjustable side members 61a and 62a are positioned both vertically and horizontally with respect to the side members 41 and 42 so that the batteries may be freely slid therebetween to the desired position on the conveyor 26 with the flanges 69 and 70 located closely adjacent the upper surfaces of said batteries and both sets of side members closely adjacent the sides of the batteries. As soon as the desired number of batteries have been positioned on the conveyor 26, the switch 79 may be actuated to energize the motor 74 and thereby rotate the shaft 21. The gear reducer 75 is so selected that the shaft 21 rotates at a fairly slow speed so that the inverting of the batteries does not occur too rapidly. During the initial part of the inverting operation, the batteries will move into contact with either the side members 41 and 42 or side members 61a or 62a, depending upon the direction of rotation of the shaft 21. As rotation of the shaft continues, the parts will be brought to the position wherein the batteries will slide downwardly on the side members into contact with the laterally extending flanges 69 and 70. Thereafter, and when the conveyor is in the completely inverted position, the batteries will be supported primarily upon said flanges and the acid will drain therefrom into tank 11. As the conveyor 26 approaches its lowermost horizontal position wherein the batteries are in inverted position, the cam 81 will actuate switch 80 to de-energize the motor and terminate rotation of shaft 21. As explained above, the position of the cam 81 is selected so that the shaft 21 ceases to rotate when the conveyor is in the substantially horizontal position. When rotation of shaft 21 is stopped, batteries drained previously when conveyor 27 was in the downwardmost position may be manually removed by sliding same axially of the tank onto the conveyor 83 and manually removing same from the conveyor. As soon as the previously drained batteries have been removed, a new group of batteries may be placed on conveyor 27 in the same manner as described above and the operation may be repeated. A further cam 81a is provided to again stop the rotation mechanism when the apparatus has again turned through 180 degrees.

It will be apparent that the adjustable side members 61 and 62 or 61a and 62a will be adjusted with respect to the fixed side members 41 and 42 or 41a and 42a in order to provide a battery receiving zone of width sufficient to receive the batteries to be handled. The members 61 and 62 or 61a and 62a will usually be positioned so that the batteries can freely move axially along the conveyor but are not capable of substantial sidewise movement.

The use of the axially extending flanges 69 and 70 will provide a satisfactory support for the batteries when same are in inverted position and will not require any side clamping of the battery casings or similar expedients which might possibly cause damage to the battery casings.

While a particular embodiment of the invention has been disclosed herein, it will be understood that the invention contemplates such changes or modifications thereof as lie within the scope of the appended claims.

I claim:

1. A machine for dumping acid from batteries, comprising: an elongated, hemicylindrical tank having an open top and frame means for supporting said tank in substantially horizontal position; an elongated shaft substantially coaxial with said tank and means rotatably supporting the respective axial ends of said shaft adjacent the respective ends of said tank; a frame secured to said shaft for simultaneously supporting two groups of batteries, one of said groups being in an inverted position, said battery support frame including a pair of elongated, parallel, straight-line roller conveyors secured to said shaft on diametrically opposite sides thereof and positioned in back-to-back relationship, the rollers on said conveyors defining a pair of parallel battery-supporting planes lying tangent thereto and located on the sides of said conveyors remote from said shaft; upright frame members secured to the side edges of said conveyors and extending transverse thereto; side members secured to said upright members and extending longitudinally of said conveyors above the respective side edges thereof, said side members above each conveyor being opposed and defining, with the battery-supporting plane thereof, a battery-receiving zone; means supporting the side members on one side of each of said battery receiving zones for adjustable movement toward and away from the other side of said zone to vary the width thereof; said side members having flanges extending toward each other and transversely of said zones whereby batteries may be supported thereon when in an inverted position; a platform mounted at one end of said tank; a motor supported on said platform and means drivingly connecting said motor to said shaft for rotating same; a switch for de-energizing said motor and means on said frame for actuating said switch so that said motor stops rotation of said shaft when said conveyors are in substantially horizontal position; and a stationary conveyor supported on said platform and longitudinally aligned with the uppermost battery supporting conveyor when said battery supporting conveyors are in horizontal position.

2. A machine for dumping acid from batteries, comprising: an elongated tank having an open top and frame means for supporting said tank in a substantially horizontal position; an elongated shaft extending longitudinally of said tank adjacent the top thereof and means rotatably supporting said shaft on said tank; a frame mounted on said shaft and adapted for simultaneously supporting two groups of batteries so that when one of said groups is in an inverted position the other is in an upright position, said frame including a pair of elongated, parallel, straight-line roller conveyors secured to said shaft and located on diametrically opposite sides thereof and positioned in back-to-back relationship, said conveyor being spaced apart a distance not substantially greater than the diameter of said shaft, the rollers on said conveyors defining a pair of parallel battery-supporting planes located on the sides of said conveyors remote from said shaft; upright frame members secured to the side edges of said conveyors and extending transverse thereto; side members secured to said upright members and extending longitudinally of said conveyors above the respective side edges thereof, said side members above each conveyor being opposed and defining, with the battery-supporting plane thereof, a battery-receiving zone; means supporting the side members on one side of each of said battery-receiving zones for adjustable movement toward and away from the other side of said zone to vary the width thereof; support means on the sides of each said zone adjacent the upper end thereof and extending transversely of said zone toward each other and adapted for supporting batteries when same are in an inverted position; a motor and means drivingly connecting said motor to said shaft; switch means responsive to rotation of said shaft for stopping operation of said motor when the conveyors are in a substantially horizontal position.

3. A machine for dumping acid from batteries, comprising in combination: an elongated, substantially horizontal tank having an open top and frame means for supporting said tank; an elongated shaft extending between the ends of said tank and parallel with the longitudinal axis of said tank and positioned adjacent the upper edge thereof; means on the respective ends of said tank for rotatably supporting the respective ends of said shaft; a pair of elongated, parallel, straight-line roller conveyors secured to said shaft on diametrically opposite sides thereof, said conveyors being of lesser length than the length of said tank and being positioned between the ends thereof for movement therewithin, the axes of the rollers on each conveyor lying in a common plane so that batteries may be supported on the rollers of each conveyor in a plane parallel with said common plane and tangent to said rollers, said battery support plane being on the side of each conveyor remote from said shaft; a battery guide frame secured to each conveyor, each said battery guide frame including opposed, longitudinally extending side members positioned respectively, above the side edges of its conveyor and defining with said plane a zone into which batteries may be received; means for moving the side members of one of the sides of said frame toward and away from the other side of said frame to thereby adjust the width of said zone, said last-named means including bars extending transversely to said movable side members and extending away from said zone, upstanding vertical support members secured to one side edge of said conveyor, said support members having clamping sleeves thereon, said bars slidably extending through said sleeves and means for drawing each of said clamping sleeves together to releasably clamp each of said bars in fixed position; means extending transversely across said zone adjacent the upper edge thereof for supporting batteries when the conveyors are positioned so that the batteries are inverted; a motor supported adjacent one end of said tank and means driven by said motor and connected to said shaft for rotating said shaft; control means for said motor, and means for actuating said control means to de-energize said motor and thereby terminate rotation of said shaft after the uppermost conveyor has been rotated to a position where it faces downwardly.

References Cited in the file of this patent

UNITED STATES PATENTS

| | | |
|---|---|---|
| 1,967,719 | Morgan | July 24, 1934 |
| 2,741,815 | Young | Apr. 17, 1956 |
| 2,830,605 | Kleeman et al. | Apr. 15, 1958 |